US006498688B2

(12) United States Patent
Shibayama (10) Patent No.: US 6,498,688 B2
(45) Date of Patent: Dec. 24, 2002

(54) ZOOM LENS SYSTEM

(75) Inventor: Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/083,398

(22) Filed: Feb. 27, 2002

(65) Prior Publication Data

US 2002/0167736 A1 Nov. 14, 2002

(30) Foreign Application Priority Data

Mar. 8, 2001 (JP) ........................................ 2001-065242

(51) Int. Cl.$^7$ ................................................ G02B 15/14
(52) U.S. Cl. ........................ 359/689; 359/680; 359/682; 359/683; 359/676; 359/708; 359/713
(58) Field of Search ................................ 359/680–682, 359/683, 689, 676, 708, 713

(56) References Cited

U.S. PATENT DOCUMENTS

| 5,909,318 A | 6/1999 | Tanaka ........................ 359/689 |
| 6,124,984 A | 9/2000 | Shibayama et al. ......... 359/689 |
| 6,349,002 B1 | 2/2002 | Shibayama et al. ......... 359/689 |

FOREIGN PATENT DOCUMENTS

| JP | 10-170826 | 6/1998 |
| JP | 10-293253 | 11/1998 |
| JP | 11-23967 | 1/1999 |
| JP | 11-52246 | 2/1999 |
| JP | 2001-13408 | 1/2001 |

*Primary Examiner*—Georgia Epps
*Assistant Examiner*—M. Hasan
(74) *Attorney, Agent, or Firm*—Miles & Stockbridge P.C.

(57) ABSTRACT

The present invention provides a compact zoom lens system suitable for a video camera and a digital still camera using a solid-state imaging device, having a zoom ratio of 3.5 or more, an angle of view in a wide-angle end state of about 60°, and superb optical performance. According to one aspect, in order from an object side, a first lens group has negative refractive power, a second lens group has positive refractive power, and a third lens group has positive refractive power. The front principal point of the second lens group is located to the object side of the most object side surface of the second lens group. The distance between the first and second lens group is decreased and the distance between the second and third lens group is increased upon zooming from a wide-angle end state to a telephoto end state. Predetermined conditional expressions are satisfied.

9 Claims, 8 Drawing Sheets

FIG.1

ZOOM LENS SYSTEM

This application claims the benefit of Japanese Patent application No. 2001-065242 which is hereby incorporated by reference.

BACKGROUND OF THE INVENTION

1. Field of the Invention

The present invention relates to a zoom lens system suitable for a video camera and a digital still camera using a solid-state imaging device and, in particular, relates to a compact zoom lens system having a zoom ratio of 3.5 or more, an angle of view in a wide-angle end state of about 60°, and superb optical performance.

2. Related Background Art

So far zoom lens systems disclosed in Japanese Patent Application Laid-Open No. 11-52246 have been known to be those suitable for a solid-state imaging device.

However, zoom lens systems disclosed in Japanese Patent Application Laid-Open No. 11-52246 have relatively small zoom ratio of about three. Therefore, it has been a problem to be insufficient zoom ratio.

SUMMARY OF THE INVENTION

The present invention is made in view of the aforementioned problem and has an object to provide a compact zoom lens system, which is suitable for a video camera and a digital still camera using a solid-state imaging device, having a zoom ratio of 3.5 or more, an angle of view in a wide-angle end state of about 60°, and superb optical performance.

According to one aspect of the present invention, a zoom lens system includes, in order from an object side, a first lens group having negative refractive power, a second lens group having positive refractive power, and a third lens group having positive refractive power. The front principal point of the second lens group is located to the object side of the most object side surface of the second lens group. The distance between the first lens group and the second lens group is decreased and the distance between the second lens group and the third lens group is increased, when the state of lens group positions is changed from a wide-angle end state to a telephoto end state. The following conditional expressions (1), (2), and (3) are satisfied:

$$0 < H1/fw < 0.6 \tag{1}$$

$$1.0 < H2/fw < 2.2 \tag{2}$$

$$1.6 < f3/f2 < 3.0 \tag{3}$$

where H1 denotes the distance between the front principal point of the second lens group and the most object side surface of the second lens group, H2 denotes the distance between the rear principal point of the second lens group and the most image side surface of the second lens group, fw denotes the focal length of the zoom lens system in the wide-angle end state, f2 denotes the focal length of the second lens group, and f3 denotes the focal length of the third lens group.

In one preferred embodiment of the present invention, the first lens group and the second lens group are moved and the third lens group is fixed when the state of lens group positions is changed from the wide-angle end state to the telephoto end state. The following conditional expression (4) is satisfied:

$$2.6 < M/fw < 3.0 \tag{4}$$

where M denotes the moving distance of the second lens group along the optical axis between the position locating the most object side and that locating the most image side upon zooming.

In one preferred embodiment of the present invention, the second lens group is composed of, in order from the object side, a first lens unit having positive refractive power, a second lens unit having negative refractive power, a third lens unit having negative refractive power, and a fourth lens unit having positive refractive power.

The following conditional expressions (5), (6), (7), and (8) are satisfied:

$$0.6 < f21/f2 < 1.0 \tag{5}$$

$$0.7 < |f22|/f2 < 2.0 \, (f22 < 0) \tag{6}$$

$$0.2 < |f23|/f2 < 10.0 \, (f23 < 0) \tag{7}$$

$$1.2 < f24/f2 < 3.0 \tag{8}$$

where f21 denotes the focal length of the first lens unit, f22 denotes the focal length of the second lens unit, f23 denotes the focal length of the third lens unit, and f24 denotes the focal length of the fourth lens unit.

In one preferred embodiment of the present invention, the first lens unit includes a cemented lens constructed by, in order from the object side, a double convex positive lens having an aspherical surface facing to the object side cemented with a negative meniscus lens.

In one preferred embodiment of the present invention, the second lens unit includes a cemented lens constructed by, in order from the object side, a double convex positive lens cemented with a double concave negative lens.

In one preferred embodiment of the present invention, the third lens unit includes a negative meniscus lens having a convex surface facing to the object side.

In one preferred embodiment of the present invention, the fourth lens unit includes a positive meniscus lens having a convex surface facing to the object side.

In one preferred embodiment of the present invention, the first lens group is composed of, in order from the object side, a negative meniscus lens having a convex surface facing to the object side, a double concave negative lens having a stronger concave surface facing to the image side, and a positive meniscus lens having a convex surface facing to the object side.

In one preferred embodiment of the present invention, the third lens group is composed of a double convex positive lens having at least one aspherical surface.

DESCRIPTION OF THE PREFERRED EMBODIMENTS

Figure 1:
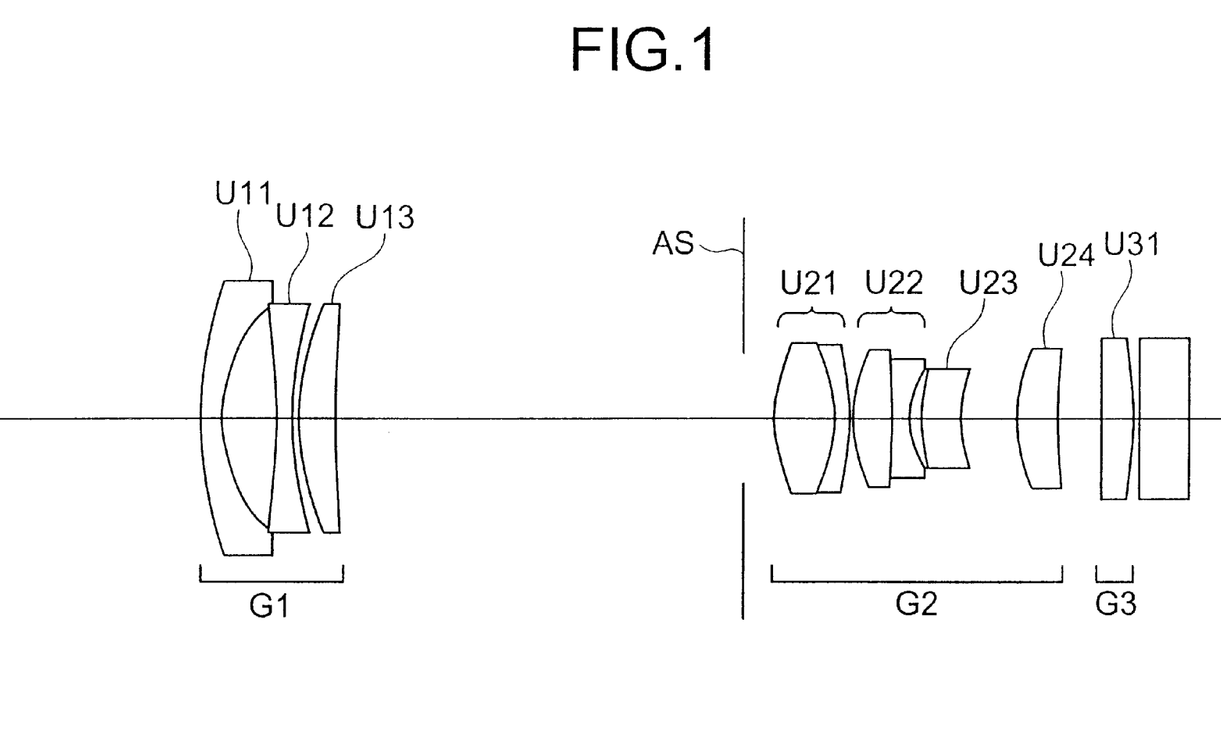
FIG. 1 is a drawing showing a lens configuration of a zoom lens system according to Example 1 of the present invention.
Figure 2:
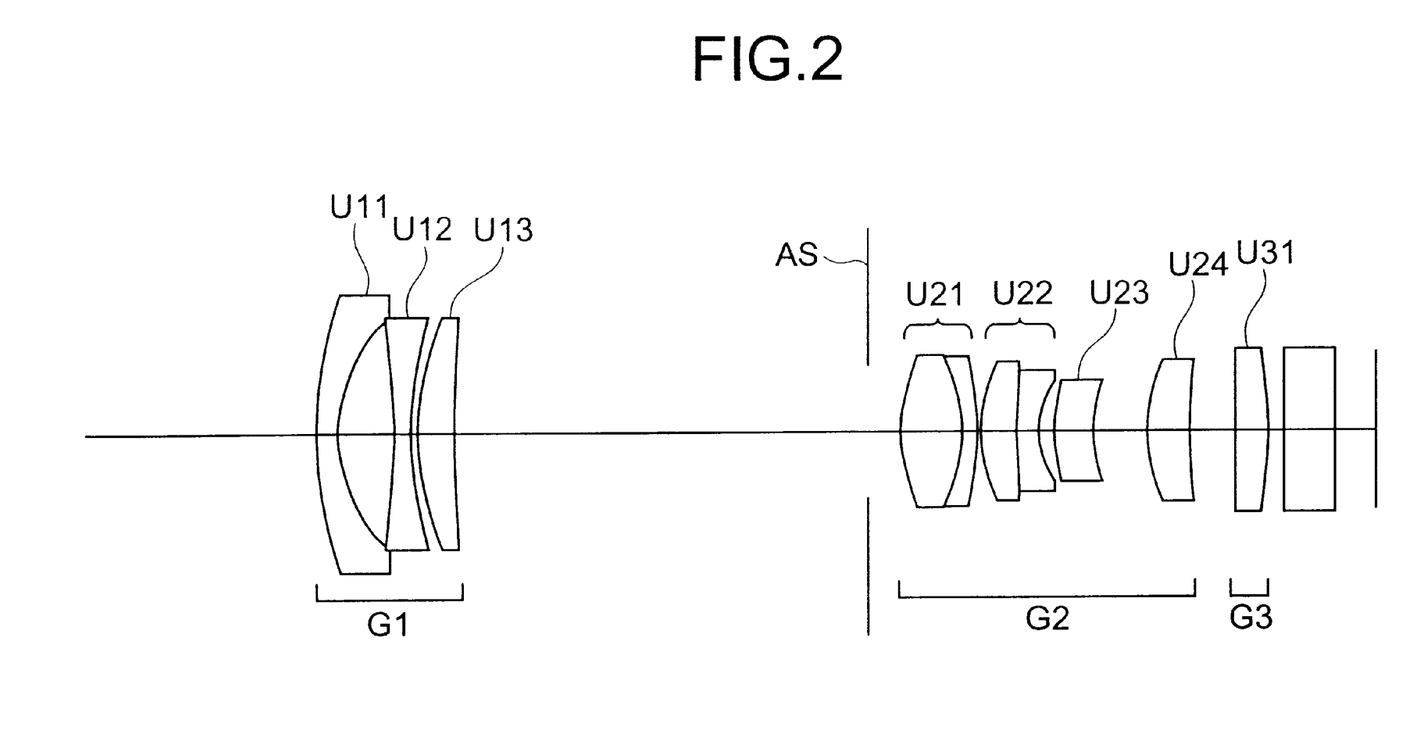
FIG. 2 is a drawing showing a lens configuration of a zoom lens system according to Example 2 of the present invention.
Figure 3A:
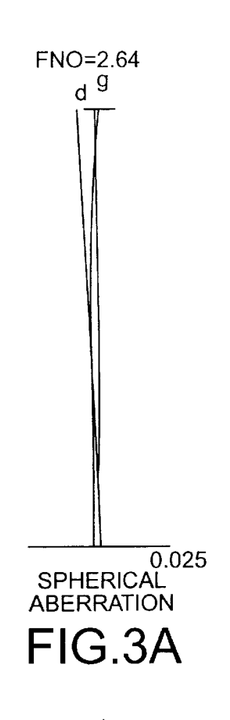
FIGS. 3A–3E are graphs showing various aberrations in the wide-angle end state according to Example 1 of the present invention.
Figure 3B:
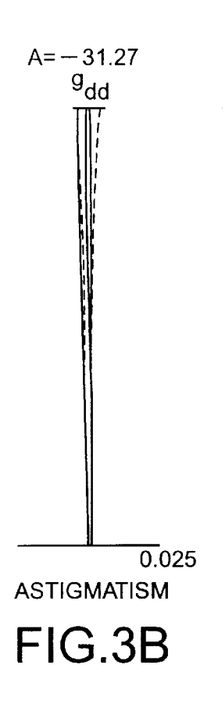
Figure 3C:
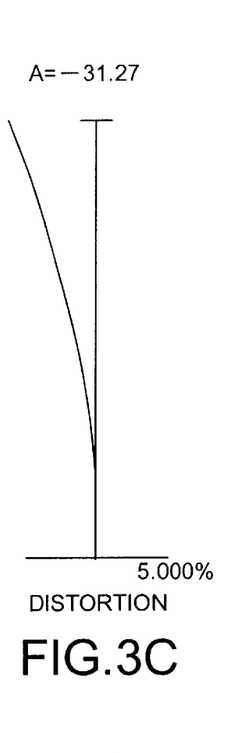
Figure 3D:
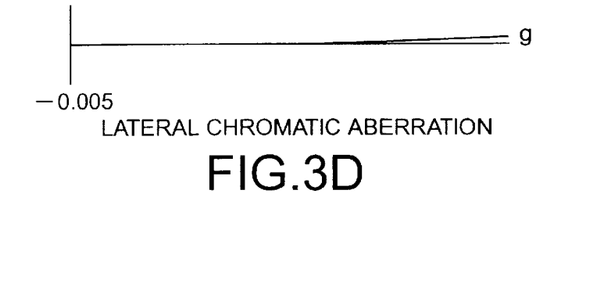
Figure 3E:
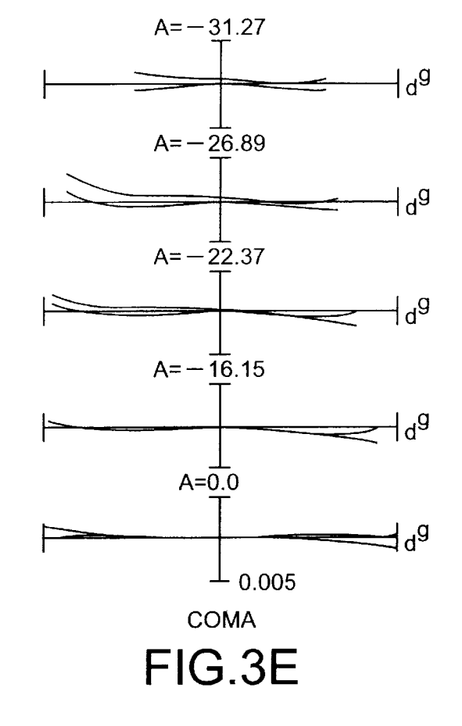
Figure 4A:
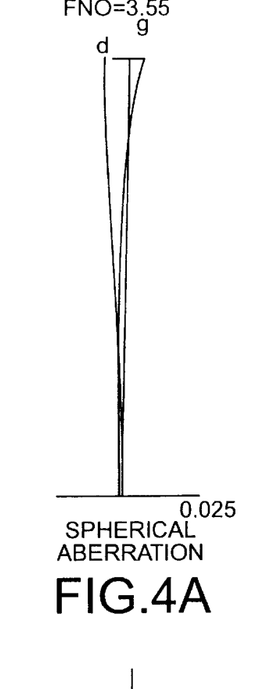
FIGS. 4A–4E are graphs showing various aberrations in the intermediate focal length state according to Example 1 of the present invention.
Figure 4B:
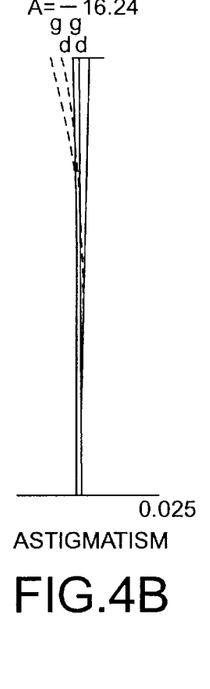
Figure 4C:
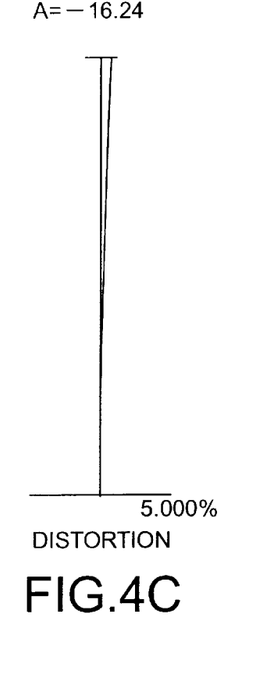
Figure 4D:
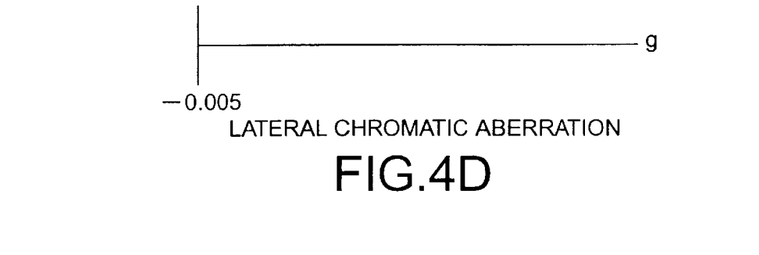
Figure 4E:
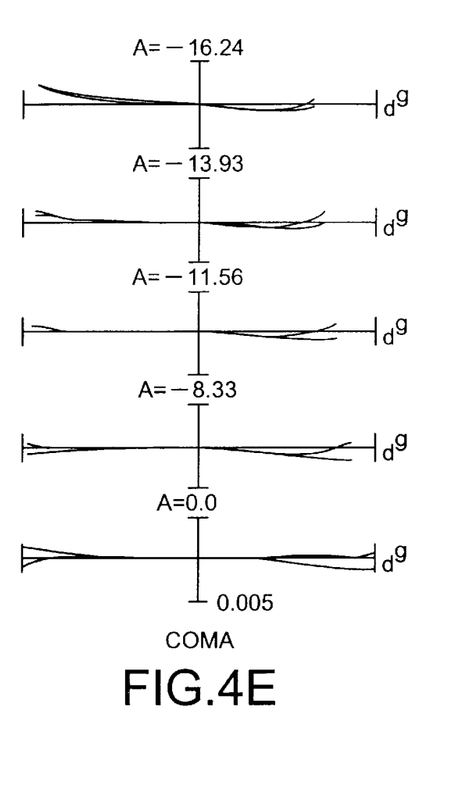
Figure 5A:
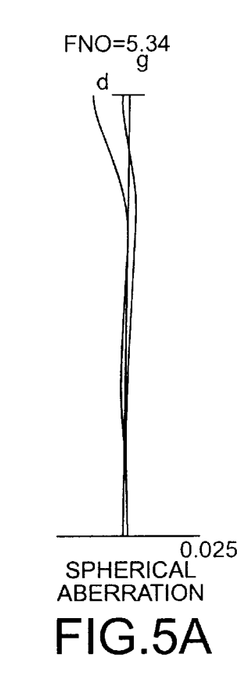
FIGS. 5A–5E are graphs showing various aberrations in the telephoto end state according to Example 1 of the present invention.
Figure 5B:
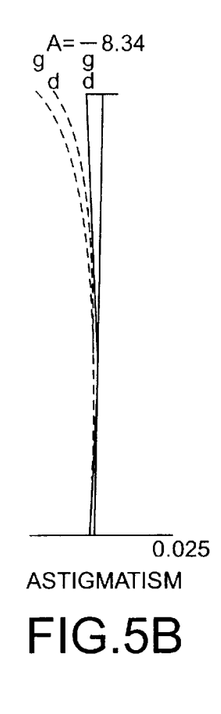
Figures 5C, 5E:
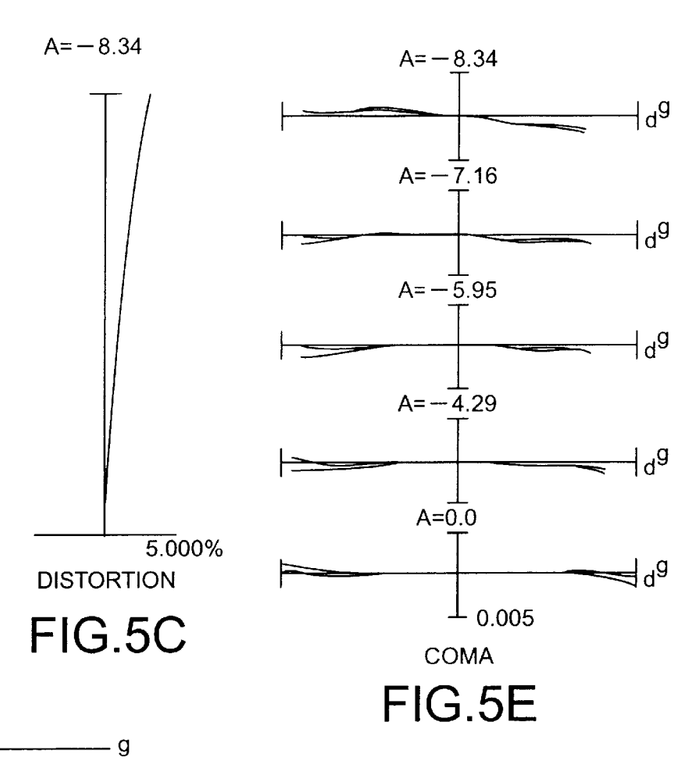
Figure 5D:
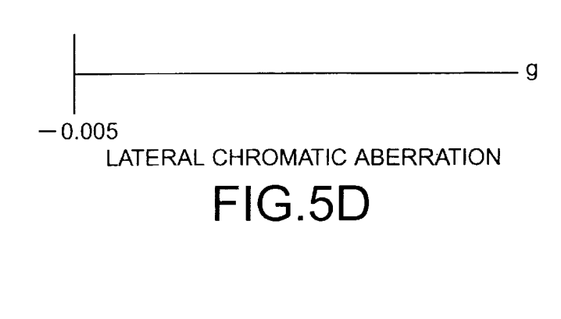
Figure 6:
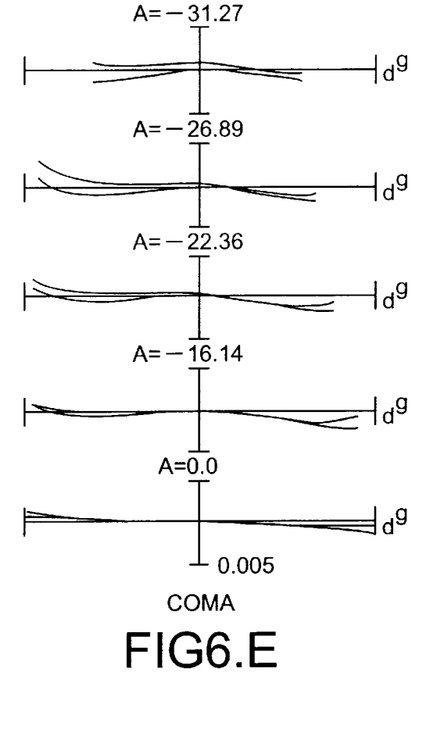
FIGS. 6A–6E are graphs showing various aberrations in the wide-angle end state according to Example 2 of the present invention.
Figure 6A:
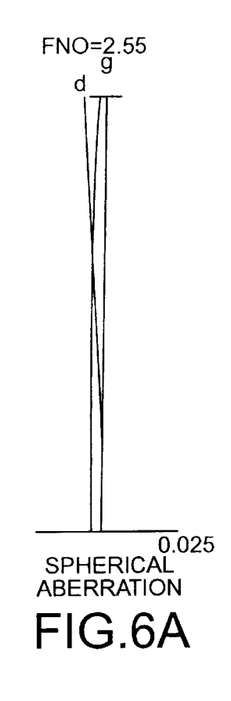
Figure 6B:
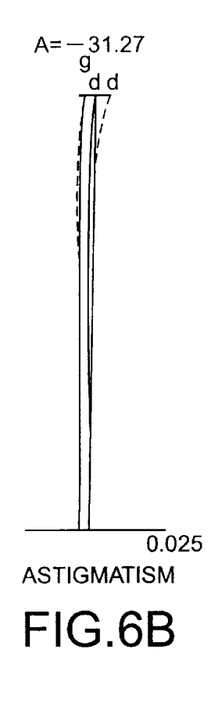
Figure 6C:
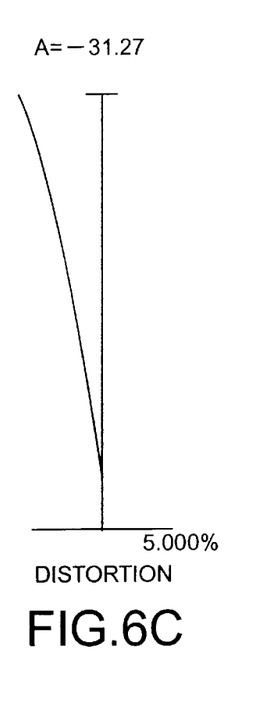
Figure 6D:
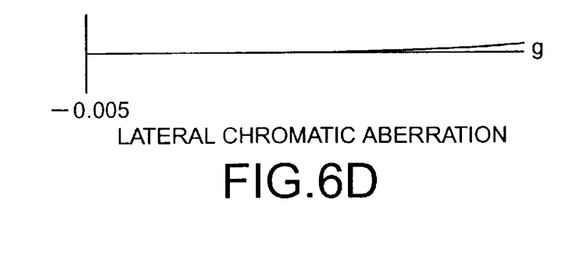
Figure 7:
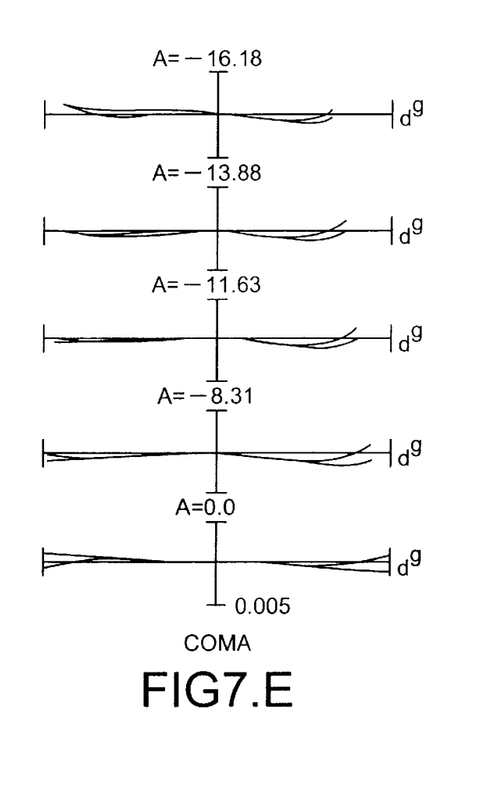
FIGS. 7A–7E are graphs showing various aberrations in the intermediate focal length state according to Example 2 of the present invention.
Figure 7A:
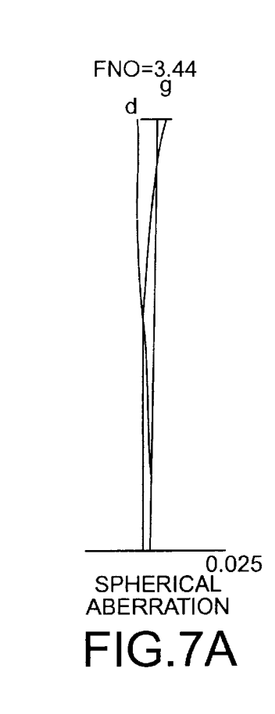
Figure 7B:
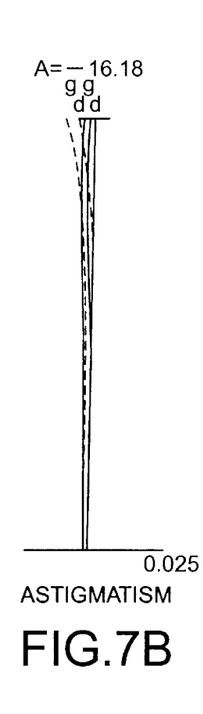
Figure 7C:
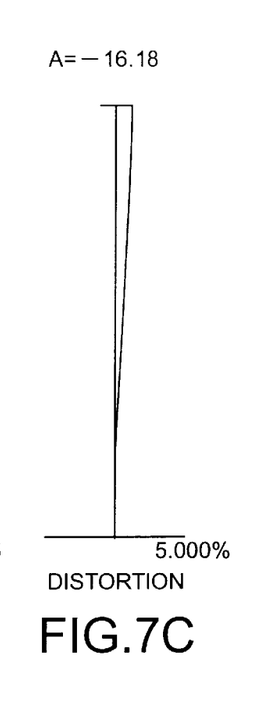
Figure 7D:
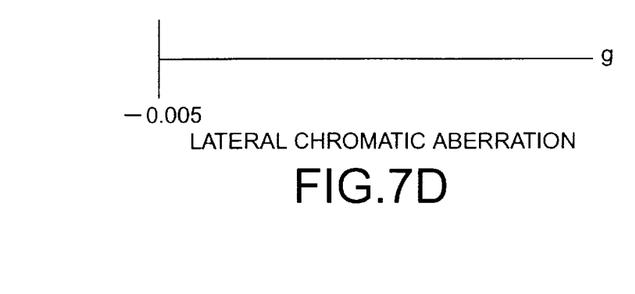
Figure 8:
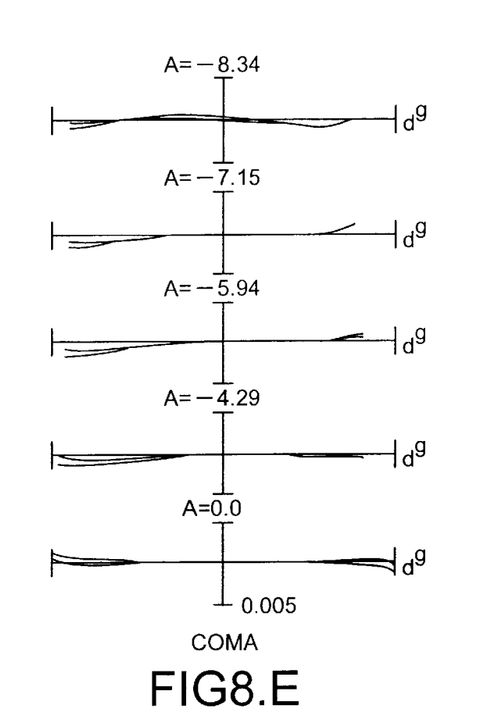
FIGS. 8A–8E are graphs showing various aberrations in the telephoto end state according to Example 2 of the present invention.
Figure 8A:
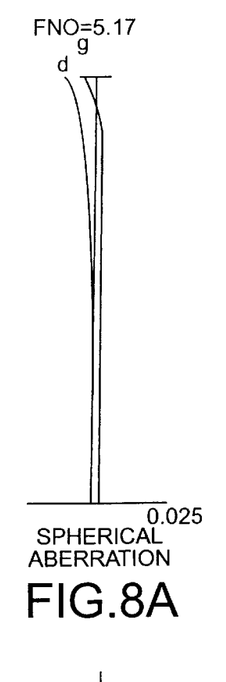
Figure 8B:
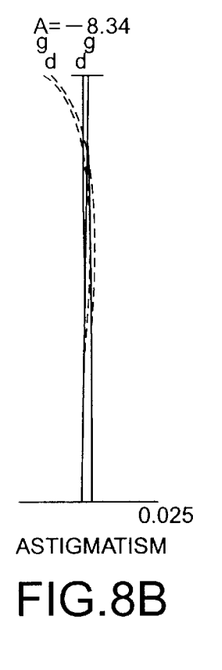
Figure 8C:
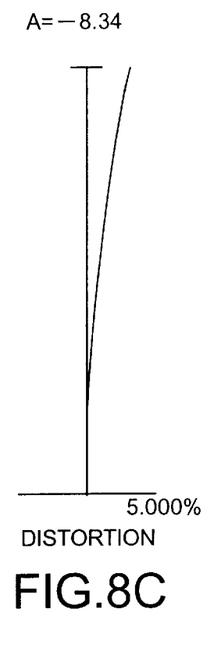
Figure 8D:
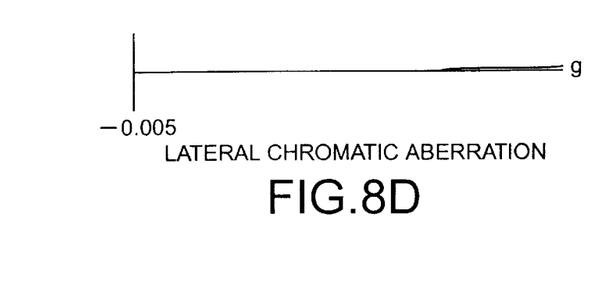

Zoom lens systems according to Examples of the present invention are going to be explained in accordance with accompanying drawings. FIGS. 1 and 2 are drawings showing lens configurations of zoom lens systems according to Example 1 and Example 2 of the present invention, respectively.

The zoom lens system according to each Example is composed of, in order from an object side, a first lens group G1 having negative refractive power, an aperture stop AS, a second lens group G2 having positive refractive power, and a third lens group G3 having positive refractive power.

The first lens group G1 is composed of, in order from the object side, a lens unit U11 constructed by a negative meniscus lens having a convex surface facing to the object side, a lens unit U12 constructed by a double concave lens having a stronger concave surface facing to an image side than that facing to the object side, and a lens unit U13 constructed by a positive meniscus lens having a convex surface facing to the object side.

The second lens group G2 is composed of, in order from the object side, a first lens unit U21 having positive refractive power, a second lens unit U22 having negative refractive power, a third lens unit U23 having negative refractive power, and a fourth lens unit U24 having positive refractive power.

The first lens unit U21 is composed of a cemented lens constructed by, in order from the object side, a double convex positive lens having an aspherical surface facing to the object side cemented with a negative meniscus lens. The second lens unit U22 is composed of a cemented lens constructed by, in order from the object side, a double convex positive lens cemented with a double concave negative lens. The third lens unit U23 is composed of a negative meniscus lens having a convex surface facing to the object side. The fourth lens unit U24 is composed of a positive meniscus lens having a convex surface facing to the object side.

The third lens group G3 is composed of a lens unit U31 constructed by a double convex positive lens having an aspherical surface facing to the image side.

With above described construction, when the state of lens group positions is changed from a wide-angle end state (a state providing the shortest focal length) to a telephoto end state (a state providing the longest focal length), the first lens group G1 and the second lens group G2 move while the third lens group G3 does not move. Thus, the distance between the first lens group G1 and the second lens group G2 is decreased and the distance between the second lens group G2 and the third lens group G3 is increased. The following conditional expressions (1) through (8) should be satisfied:

$$0 < H1/fw < 0.6 \tag{1}$$

$$1.0 < H2/fw < 2.2 \tag{2}$$

$$1.6 < f3/f2 < 3.0 \tag{3}$$

$$2.6 < M/fw < 3.0 \tag{4}$$

$$0.6 < f21/f2 < 1.0 \tag{5}$$

$$0.7 < |f22|/f2 < 2.0 \ (f22 < 0) \tag{6}$$

$$2.0 < |f23|/f2 < 10.0 \ (f23 < 0) \tag{7}$$

$$1.2 < f24/f2 < 3.0 \tag{8}$$

where H1 denotes the distance between the front principal point of the second lens group and the most object side surface of the second lens group, H2 denotes the distance between the rear principal point of the second lens group and the most image side surface of the second lens group, fw denotes the focal length of the zoom lens system in the wide-angle end state, f2 denotes the focal length of the second lens group, f3 denotes the focal length of the third lens group, M denotes the moving distance of the second lens group along the optical axis between the state locating the most object side and that locating the most image side upon zooming, f21 denotes the focal length of the first lens unit, f22 denotes the focal length of the second lens unit, f23 denotes the focal length of the third lens unit, f24 denotes the focal length of the fourth lens unit.

Conditional expression (1) is to realize a high zoom ratio. When the ratio H1/fw falls below the lower limit of conditional expression (1), it becomes difficult to sufficiently narrow the distance between the rear principal point of the first lens group and the front principal point of the second lens group in the telephoto end state. Accordingly, it becomes difficult to realize a high zoom ratio. On the other hand, when the ratio exceeds the upper limit of conditional expression (1), the power distribution in the second lens group becomes excessively telephoto state. Accordingly, it becomes difficult to realize good correction of aberration.

Conditional expression (2) is to realize good correction of aberration. When the ratio H2/fw falls below the lower limit of conditional expression (2), the construction of the second lens group becomes relatively simple, so that the degree of freedom to correct aberrations becomes small. Accordingly, in order to realize a high zoom ratio, correction of various aberrations becomes difficult. On the other hand, when the ratio exceeds the upper limit of conditional expression (2), the total lens length of the second lens group becomes large. Accordingly, the zoom lens system becomes large.

Conditional expression (3) is to realize compactness of the zoom lens system and to obtain an appropriate position of the exit pupil. By the way, it is desirable for a zoom lens system used for a solid-state imaging device that the position of the exit pupil locates sufficiently away in the object direction from the rear principal point of the zoom lens system. When the ratio f3/f2 falls below the lower limit of conditional expression (3), the refractive power of the second lens group becomes small. Accordingly, when a high zoom ratio is to be realized, the total length of the zoom lens system becomes large. On the other hand, when the ratio exceeds the upper limit of conditional expression (3), the position of the exit pupil tends to be close to the image plane in the wide-angle end state, so that it is not desirable.

Conditional expression (4) is for realizing both high optical performance and compactness with keeping a high zoom ratio. When the ratio M/fw falls below the lower limit of conditional expression (4), the production of various aberration increases. Accordingly, it becomes difficult to realize high optical performance. On the other hand, when the ratio exceeds the upper limit of conditional expression (4), the zoom lens system becomes large, so that it is not desirable.

Conditional expressions (5), (6), (7), and (8) are for realizing good correction of aberration of the second lens group. When these ratios exceed or fall blow the upper limit or the lower limit of these conditional expressions, respectively, it becomes difficult to realize good aberration correction with keeping both high zoom ratio and compactness of the zoom lens system.

Various values associated with Examples 1 and 2 are listed in Tables 1 and 2, respectively. In each specification, f denotes the focal length, B. f. denotes the back focal length, FNO denotes the f-number, and 2A denotes an angle of view.

In lens data, the first column is a surface number counted in order from the object side, the second column "r" is a radius of curvature of a lens surface, the third column "d" is a distance between adjacent lens surfaces, the fourth column "ν" is Abbe number, and the fifth column "n" is refractive index for d-line (λ=587.6 nm) where refractive index of air (n=1.00000) is abbreviated.

In aspherical data, an aspherical surface coefficient is expressed by the following equation:

$$X(y) = y^2 / [r \cdot \{1 + (1 - K \cdot y^2 / r^2)^{1/2}\}] + C4 \cdot y^4 + C6 \cdot y^6 + C8 \cdot y^8 + C10 \cdot y^{10}$$

where X(y) denotes the distance along the optical axis from the tangent plane on the vertex of the aspherical surface to the position of the aspherical surface at the height of y, r denotes a paraxial radius of curvature, K denotes the conical coefficient, and Ci denotes i-th order aspherical surface coefficient.

In zooming data, values of the focal length and varying distances in the wide-angle end state, intermediate focal length state, and telephoto end state are respectively shown.

In the tables for various values, "mm" is generally used for the unit of length such as the focal length, a radius of curvature, a distance between the adjacent surfaces. However, since an optical system proportionally enlarged or reduced its dimension can be obtained similar optical performance, the unit is not necessary to be limited to "mm" and any other suitable unit can be used.

Values for conditional expressions according to each Example are listed in Table 3.

TABLE 1

[Specification]

|  | Wide-Angle | Intermediate | Telephoto |
|---|---|---|---|
| f = | 1.000 | 1.940 | 3.762 |
| B.f. = | 0.350 |  |  |
| FNO = | 2.64 | 3.55 | 5.34 |
| 2A = | 62.54° | 32.48° | 16.68° |

[Lens Data]

|  | r | d | ν | n |  |
|---|---|---|---|---|---|
| 1 | 3.0112 | 0.1578 | 46.58 | 1.80400 |  |
| 2 | 1.1780 | 0.4126 |  |  |  |
| 3 | −6.1499 | 0.1335 | 46.58 | 1.80400 |  |
| 4 | 3.1539 | 0.0485 |  |  |  |
| 5 | 2.0520 | 0.2791 | 23.78 | 1.84666 |  |
| 6 | 11.3500 | (d 6) |  |  |  |
| 7 | ∞ | 0.2184 |  |  | Aperture Stop |
| 8 | 1.3621 | 0.4612 | 55.18 | 1.66547 | Aspherical Surface |
| 9 | −1.3047 | 0.1092 | 37.17 | 1.83400 |  |
| 10 | −2.9325 | 0.0243 |  |  |  |
| 11 | 1.1780 | 0.2913 | 58.54 | 1.65160 |  |
| 12 | −11.4357 | 0.1456 | 34.96 | 1.80100 |  |
| 13 | 0.7642 | 0.0850 |  |  |  |
| 14 | 1.7353 | 0.2913 | 34.96 | 1.80100 |  |
| 15 | 1.1012 | 0.4248 |  |  |  |
| 16 | 1.4143 | 0.3034 | 41.49 | 1.57501 |  |
| 17 | 4.8747 | (d17) |  |  |  |
| 18 | 15.7767 | 0.2427 | 57.44 | 1.60602 |  |
| 19 | −3.3516 | 0.0485 |  |  | Aspherical Surface |
| 20 | ∞ | 0.3641 | 64.10 | 1.51680 |  |
| 21 | ∞ |  |  |  |  |

[Aspherical Data]

Surface Number: 8

| K = | 1.00000 |
|---|---|
| C4 = | −0.0479300 |
| C6 = | −0.0241273 |
| C8 = | 0.0483277 |
| C10 = | −0.0661716 |

Surface Number: 19

| K = | −57.8817 |
|---|---|
| C4 = | −0.0860311 |
| C6 = | 0.278699 |
| C8 = | −0.251478 |
| C10 = | 0.000000 |

[Zooming Data]

|  | Wide-Angle end | Intermediate | Telephoto end |
|---|---|---|---|
| f | 1.00000 | 1.94053 | 3.76213 |
| d 6 | 3.07158 | 1.22258 | 0.27070 |
| d17 | 0.32105 | 1.27394 | 3.11948 |

TABLE 2

[Specification]

|  | Wide-Angle | Intermediate | Telephoto |
|---|---|---|---|
| f = | 1.000 | 1.942 | 3.762 |
| B.f. = | 0.242 |  |  |
| FNO = | 2.55 | 3.44 | 5.17 |
| 2A = | 62.54° | 32.36° | 16.68° |

[Lens Data]

|  | r | d | ν | n |  |
|---|---|---|---|---|---|
| 1 | 3.1105 | 0.1578 | 46.58 | 1.80400 |  |
| 2 | 1.1962 | 0.4368 |  |  |  |
| 3 | −5.2567 | 0.1335 | 59.47 | 1.53996 |  |
| 4 | 3.0142 | 0.0412 |  |  |  |
| 5 | 1.8860 | 0.2762 | 23.78 | 1.84666 |  |
| 6 | 4.4021 | (d 6) |  |  |  |
| 7 | ∞ | 0.2184 |  |  | Aperture Stop |
| 8 | 1.4413 | 0.3922 | 49.32 | 1.74330 | Aspherical Surface |
| 9 | −2.0224 | 0.1092 | 25.43 | 1.80518 |  |
| 10 | −4.5470 | 0.0243 |  |  |  |
| 11 | 1.4603 | 0.3053 | 60.69 | 1.56384 |  |
| 12 | −4.9732 | 0.2849 | 34.96 | 1.80100 |  |
| 13 | 0.8323 | 0.0754 |  |  |  |
| 14 | 1.3632 | 0.1823 | 34.96 | 1.80100 |  |
| 15 | 1.1079 | 0.4478 |  |  |  |
| 16 | 1.6548 | 0.2256 | 47.93 | 1.71700 |  |
| 17 | 4.3291 | (d17) |  |  |  |
| 18 | 8.5232 | 0.2427 | 59.38 | 1.58313 |  |
| 19 | −2.8160 | 0.1214 |  |  | Aspherical Surface |
| 20 | ∞ | 0.4000 | 64.14 | 1.51633 |  |
| 21 | ∞ |  |  |  |  |

[Aspherical Data]

Surface Number: 8

TABLE 2-continued

| | |
|---|---|
| K = | 1.00000 |
| C4 = | −0.0430070 |
| C6 = | −0.0114119 |
| C8 = | −0.0187353 |
| C10 = | 0.0245463 |

Surface Number: 19

| | |
|---|---|
| K = | 1.00000 |
| C4 = | 0.120353 |
| C6 = | −0.162829 |
| C8 = | 0.458834 |
| C10 = | −0.558854 |

[Zooming Data]

| | Wide-Angle end | Intermediate | Telephoto end |
|---|---|---|---|
| f | 1.00000 | 1.94175 | 3.76212 |
| d 6 | 3.09912 | 1.22825 | 0.26699 |
| d17 | 0.35434 | 1.31913 | 3.18403 |

TABLE 3

[Values for Conditional Expressions]

| | | Example 1 | Example 2 |
|---|---|---|---|
| (1) | H1/fw | 0.405 | 0.445 |
| (2) | H2/fw | 1.755 | 1.730 |
| (3) | f3/f2 | 2.331 | 1.840 |
| (4) | M/fw | 2.798 | 2.830 |
| (5) | f21/f2 | 0.825 | 0.786 |
| (6) | \|f22\|/f2 | 1.418 | 1.015 |
| (7) | \|f23\|/f2 | 2.405 | 5.445 |
| (8) | f24/f2 | 1.708 | 1.815 |

FIGS. 3A–3E through 5A–5E are graphs showing various aberrations in the wide-angle end state, intermediate focal length state, and telephoto end state according to Example 1 of the present invention, respectively. FIGS. 6A–6E through 8A–8E are graphs showing various aberrations in the wide-angle end state, intermediate focal length state, and telephoto end state according to Example 2 of the present invention, respectively.

In graphs for various aberrations in each figure, FNO denotes the f-number, d denotes d-line ($\lambda$=587.6 nm), and g denotes g-line ($\lambda$=435.6 nm). A denotes a half angle of view. In the diagrams showing spherical aberration, astigmatism, and distortion, A denotes the maximum value of a half angle of view. In the diagrams showing coma, A denotes a half angle of view for each image. In the diagrams showing astigmatism, a solid line indicates a sagittal image plane and a broken line indicates a meridional image plane.

As is apparent from the respective graphs, the zoom lens system according to each Example shows superb optical performance as a result of good corrections to various aberrations.

As described above, the present invention makes it possible to realize a compact zoom lens system, which is suitable for a video camera and a digital still camera using a solid-state imaging device, having a zoom ratio of 3.5 or more, an angle of view in a wide-angle end state of about 60°, and superb optical performance.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object side:

a first lens group having negative refractive power;

a second lens group having positive refractive power; and a third lens group having positive refractive power;

the front principal point of the second lens group being located to the object side of the most object side surface of the second lens group;

the distance between the first lens group and the second lens group being decreased and the distance between the second lens group and the third lens group being increased when the state of lens group positions is changed from a wide-angle end state to a telephoto end state; and the following conditional expressions being satisfied:

$$0 < H1/fw < 0.6$$

$$1.0 < H2/fw < 2.2$$

$$1.6 < f3/f2 < 3.0$$

where

H1 denotes the distance between the front principal point of the second lens group and the most object side surface of the second lens group;

H2 denotes the distance between the rear principal point of the second lens group and the most image side surface of the second lens group;

fw denotes the focal length of the zoom lens system in the wide-angle end state;

f2 denotes the focal length of the second lens group; and f3 denotes the focal length of the third lens group.

2. The zoom lens system according to claim 1; wherein the first lens group and the second lens group are moved and the third lens group is fixed when the state of lens group positions is changed from the wide-angle end state to the telephoto end state, and the following conditional expression is satisfied:

$$2.6 < M/fw < 3.0$$

where M denotes the moving distance of the second lens group along the optical axis between the position locating the most object side and that locating the most image side upon zooming.

3. The zoom lens system according to claim 2, wherein the second lens group is composed of, in order from the object side;

a first lens unit having positive refractive power;

a second lens unit having negative refractive power;

a third lens unit having negative refractive power; and a fourth lens unit having positive refractive power;

wherein the following conditional expressions are satisfied;

$$0.6 < f21/f2 < 1.0$$

$$0.7 < |f22|/f2 < 2.0 (f22 < 0)$$

$$2.0 < |f23|/f2 < 10.0 (f23 < 0)$$

$$1.2 < f24/f2 < 3.0$$

where f21 denotes the focal length of the first lens unit;

f22 denotes the focal length of the second lens unit;

f23 denotes the focal length of the third lens unit;

f24 denotes the focal length of the fourth lens unit.

4. The zoom lens system according to claim 3, wherein the first lens unit includes a cemented lens constructed by, in order from the object side, a double convex positive lens having an aspherical surface facing to the object side cemented with a negative meniscus lens.

5. The zoom lens system according to claim 3, wherein the second lens unit includes a cemented lens constructed by, in order from the object side, a double convex positive lens cemented with a double concave negative lens.

6. The zoom lens system according to claim 3, wherein the third lens unit includes a negative meniscus lens having a convex surface facing to the object side.

7. The zoom lens system according to claim 3, wherein the fourth lens unit includes a positive meniscus lens having a convex surface facing to the object side.

8. The zoom lens system according to claim 3, wherein the first lens group is composed of, in order from the object side;

a negative meniscus lens having a convex surface facing to the object side;

a double concave negative lens having a stronger concave surface facing to the image side; and a positive meniscus lens having a convex surface facing to the object side.

9. The zoom lens system according to claim 3, wherein the third lens group is composed of a double convex positive lens having at least one aspherical surface.

* * * * *